US011497073B2

(12) United States Patent
Sevindik

(10) Patent No.: US 11,497,073 B2
(45) Date of Patent: Nov. 8, 2022

(54) DUAL WIRELESS CONNECTION MODE, CONTROL, AND BANDWIDTH ADJUSTMENT

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/951,227

(22) Filed: Nov. 18, 2020

(65) Prior Publication Data

US 2022/0159756 A1 May 19, 2022

(51) Int. Cl.

| | |
|---|---|
| ***H04W 76/15*** | (2018.01) |
| ***H04W 28/20*** | (2009.01) |
| ***H04W 16/10*** | (2009.01) |
| ***H04W 16/14*** | (2009.01) |
| ***H04W 36/00*** | (2009.01) |

(52) U.S. Cl.

CPC .......... *H04W 76/15* (2018.02); *H04W 28/20* (2013.01); *H04W 36/0069* (2018.08)

(58) Field of Classification Search

CPC . H04W 76/15; H04W 28/20; H04W 36/0069; H04W 16/10; H04W 16/14

See application file for complete search history.

(56) References Cited

U.S. PATENT DOCUMENTS

| | | | | |
|---|---|---|---|---|
| 8,300,540 | B2 * | 10/2012 | Park | H04L 5/0039 370/252 |
| 10,667,142 | B2 * | 5/2020 | Sevindik | H04W 72/04 |
| 10,674,408 | B2 * | 6/2020 | Hannan | H04W 16/10 |
| 10,939,365 | B1 * | 3/2021 | Sung | H04W 24/10 |
| 10,966,264 | B2 * | 3/2021 | Sevindik | H04W 72/085 |
| 10,979,908 | B2 * | 4/2021 | Singh | H04W 16/14 |
| 11,064,389 | B1 * | 7/2021 | Sevindik | H04W 24/08 |
| 11,089,512 | B2 * | 8/2021 | Kwok | H04W 28/0236 |
| 11,115,839 | B1 * | 9/2021 | Marupaduga | H04W 24/02 |
| 11,115,866 | B2 * | 9/2021 | Harel | H04W 40/16 |
| 11,140,606 | B2 * | 10/2021 | Sevindik | H04W 80/02 |
| 11,159,988 | B2 * | 10/2021 | Nekoui | H04W 4/46 |
| 11,206,548 | B2 * | 12/2021 | Zhu | H04W 76/16 |
| 11,265,751 | B1 * | 3/2022 | Marupaduga | H04W 28/0252 |
| 11,297,515 | B2 * | 4/2022 | Sevindik | H04W 76/14 |
| 2017/0164234 | A1 * | 6/2017 | Kalapatapu | H04W 28/10 |
| 2020/0288523 | A1 * | 9/2020 | Patil | H04W 80/02 |
| 2020/0305209 | A1 * | 9/2020 | Hosseini | H04W 8/24 |

(Continued)

*Primary Examiner* — Ahmed Elallam

(74) *Attorney, Agent, or Firm* — Armis IP Law, LLC

(57) ABSTRACT

A communication system includes a first wireless station and a second wireless station. A communication management resource establishes a first wireless communication link between the first wireless station and a mobile communication device. The communication management resource receives notification of a second wireless communication link between the second wireless station and the mobile communication device. In response to impairment of (such as loss bandwidth over) the second wireless communication link and its ability to convey wireless communications, the communication management resource (such as associated with the first wireless base station) adjusts usage of the first wireless communication link to support the second wireless communication link.

34 Claims, 11 Drawing Sheets

(56) References Cited

U.S. PATENT DOCUMENTS

2020/0314941 A1* 10/2020 Bai ......................... H04L 5/001
2020/0351898 A1* 11/2020 Zhao ................... H04W 72/082
2020/0396643 A1* 12/2020 Kwok ............... H04W 28/0975
2021/0022073 A1* 1/2021 Kwok ................... H04W 76/15
2021/0076379 A1* 3/2021 Lan ........................ H04B 1/006
2021/0143893 A1* 5/2021 Taneja .................. H04W 28/26
2021/0185541 A1* 6/2021 Potharaju .............. H04W 48/16
2021/0195446 A1* 6/2021 Sevindik ............... H04W 88/04
2021/0219143 A1* 7/2021 Khalid .................. H04W 16/14
2021/0250833 A1* 8/2021 Ioffe ................. H04W 56/0005

* cited by examiner

DUAL WIRELESS CONNECTION MODE, CONTROL, AND BANDWIDTH ADJUSTMENT

BACKGROUND

Conventional wireless networks typically include one or more wireless base stations that provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or customer premises equipment. For example, a base station can be configured to communicate with the SAS to receive notification of one or more wireless channels allocated for use.

Subsequent to wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In certain instances, the one or more allocated channels in conventional wireless systems may be partitioned to include multiple timeslots used by respective wireless stations to communicate in a respective wireless network environment.

BRIEF DESCRIPTION OF EMBODIMENTS

Embodiments herein provide novel ways of providing improved wireless communications to one or more communication devices in a network environment.

More specifically, in one embodiment, a communication system includes a first wireless base station and a second wireless base station. A communication management resource establishes a first wireless communication link between a first wireless station and a mobile communication device. The communication management resource receives notification of a second wireless communication link between a second wireless station and the mobile communication device. In response to impairment (such as loss bandwidth) of the second wireless communication link to convey wireless communications, the communication management resource adjusts usage of the first wireless communication link to accommodate the loss bandwidth.

For example, in one embodiment, adjusting usage of the first wireless communication link includes, via the communication management resource: i) receiving a message from the second wireless base station, the message targeted for delivery to the mobile communication device; and communicating the message from the first wireless base station over the first wireless communication link to the mobile communication device.

In accordance with further example embodiments, the impairment of the second wireless communication link is a reduced ability (such as loss of bandwidth) of the second wireless communication link to convey communications from the second wireless base station in a downlink direction from the second wireless base station to the mobile communication device.

In accordance with further example embodiments, adjusting usage of the first wireless communication link to support the second wireless communication link includes: supporting downlink communications associated with the second wireless base station over the first wireless communication link from the first wireless base station to the mobile communication device.

In still further example embodiments, supporting downlink communications associated with the second wireless base station over the first wireless communication link from the first wireless base station to the mobile communication device includes: increasing an amount of bandwidth allocated to communicate in a downlink direction from the first wireless base station to the mobile communication device.

Further embodiments herein include, via the communication management resource, transmitting a command from the first wireless base station to the mobile communication device over the first wireless communication link; the command controls transmission of wireless uplink communications over the second wireless communication link from the mobile communication device to the second wireless base station.

In accordance with further example embodiments, the second wireless base station notifies the mobile communication device of the impairment (such as loss of bandwidth) associated with the second wireless communication link to convey the wireless communications. The notification prompts the mobile communication device to request downlink bandwidth from the first wireless base station to accommodate the loss of downlink bandwidth over the second wireless communication link.

Further embodiments herein include, at the first wireless base station, receiving a request message over the first wireless communication link from the mobile communication device. The request message includes a request to change downlink bandwidth or allocated frames over the first wireless communication link from the first wireless base station to the mobile communication device. In one embodiment, the request message notifies the first wireless base station to increase its corresponding downlink bandwidth to accommodate the loss of downlink bandwidth over the second wireless communication link.

Further embodiments herein include increasing the amount of bandwidth allocated to communicate in a downlink direction from the first wireless base station to the mobile communication device over the first wireless communication link to accommodate loss of bandwidth in the first wireless communication link to convey wireless communications in a downlink direction from the second wireless base station to the mobile communication device.

The wireless bandwidth associated with the first wireless communication link and the second wireless communication link can be allocated in any suitable manner. For example, in one embodiment, one or more of the first wireless base station and the second wireless base station communicate with a spectrum access system for allocation of wireless bandwidth to support the first wireless communication link and the second wireless communication link. The allocation of bandwidth core network change at any time. For example, the spectrum access system may notify the first wireless base station that it is no longer able to communicate on a channel supporting downlink communications from the second wireless base station to the mobile communication device.

Note further that the first wireless base station and the second wireless base station can be implemented to support any suitable wireless communication protocol. In one embodiment, the first wireless base station is a first CBSD (Citizens Broadband radio Service Device); the second wireless base station is a second CBSD (Citizens Broadband radio Service Device). As previously discussed, one or more spectrum access systems allocate use of wireless bandwidth to the first wireless base station, the second wireless base station, and the mobile communication device.

In still further example embodiments, the first wireless communication link is established between the first wireless base station and the mobile communication device in accordance with a first wireless communication protocol such as a 5G wireless communication protocol. In such an instance, the first wireless communication link supports 5G wireless communications. The second wireless communication link is established between the second wireless base station and the mobile communication device in accordance with a second wireless communication protocol such as a 4G wireless communication protocol. In such an instance, the second wireless communication link supports 4G wireless communications.

In still further embodiments, in 5G networks, note that there are multiple beams sent from the base station; and there is one beam per UE in the network. Conventional SAS systems are designed for 4G/LTE (Long Term Evolution); the SAS reduces power of base station which transmits one big beam, and packet scheduler decides which UE will be served by this big beam. In one embodiment, since there are multiple beams in 5G system, SAS will power down power of all beams transmitted from 5G base station and this will degrade the performance for each UE in the network. However, 5G NR base station can use more directed beam to serve a UE and this directed beam will not cause interference to other CBRS networks.

In the mobile communication device (a.k.a., UE or user equipment), in one embodiment, there is one chipset supporting both 4G/LTE and 5G/NR. Thus, the mobile communication device is capable of communicating via 4G and 5G wireless communications. In a dual connection mode, UE is connected with both 4G and 5G CBSD base stations simultaneously, and since 3.5 GHz band is a TDD (Time-Division Duplex) band, there is certain frame configuration that a respective UE uses to communicate with one or more wireless base stations.

As previously discussed, embodiments herein include new methods to manage frame configurations together with novel SAS management.

For example, in one embodiment, in Operation 1—CBSD #1 (such as 5G) turns on and connects with SAS, and CBSD #2 (spectrum access system 4G) turns on connects with SAS.

Operation 2—It is highly likely that CBSD #2 will be powered down first, and CBSD 1 will be powered down later.

Operation 3—When CBSD #2 powers down, DL (DownLink) wireless coverage will shrink for CBSD #2, however UL (UpLink) coverage for CBSD #2 will stay the same. Therefore, the UE is forced to use fewer number of DL frames in 4G, and the same number of UL subframe in 4G, and more DL subframes in 5g as described herein.

Operation 4—When CBSD #2 coverage shrinks, the CBSD #2 signals (notifies) the UE that its coverage will shrink.

Operation 5—Since UE has simultaneous connection with CBSD #1 and CBSD #2, the UE will send an request message such as demanding an 'Increase in DL subframes' to the CBSD #1 to communicate from the CBSD #1 to the mobile communication device.

Operation 6—CBSD #1 accepts this message, adjust the frame configuration, and send new DL configuration information to the UE. For example, the CBSD #1 performs one or more of the following operations:

a. CBSD #1 sends new DL data using the new DL subframe configuration,
b. CBSD #1 receives the UE's existing DL data from CBSD #2 if there is unfinished DL data transmission and communicates the data in the downlink from the CBSD #1 to the mobile communication device,
c. CBSD #1 sends any newly requested data to the UE if UE requests new traffic (such as via the uplink) from CBSD #1.

Embodiments herein are useful over conventional techniques because they provide a unique way of adjusting wireless bandwidth usage to accommodate changes in wireless network services.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: establish a first wireless communication link between a first wireless base station and a mobile communication device; receive notification of a second wireless communication link between a second wireless base station and the mobile communication device; and adjust usage of the first wireless communication link to support the second wireless communication link in response to loss of available bandwidth (e.g. an impairment) over the first wireless communication link to convey wireless communications.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
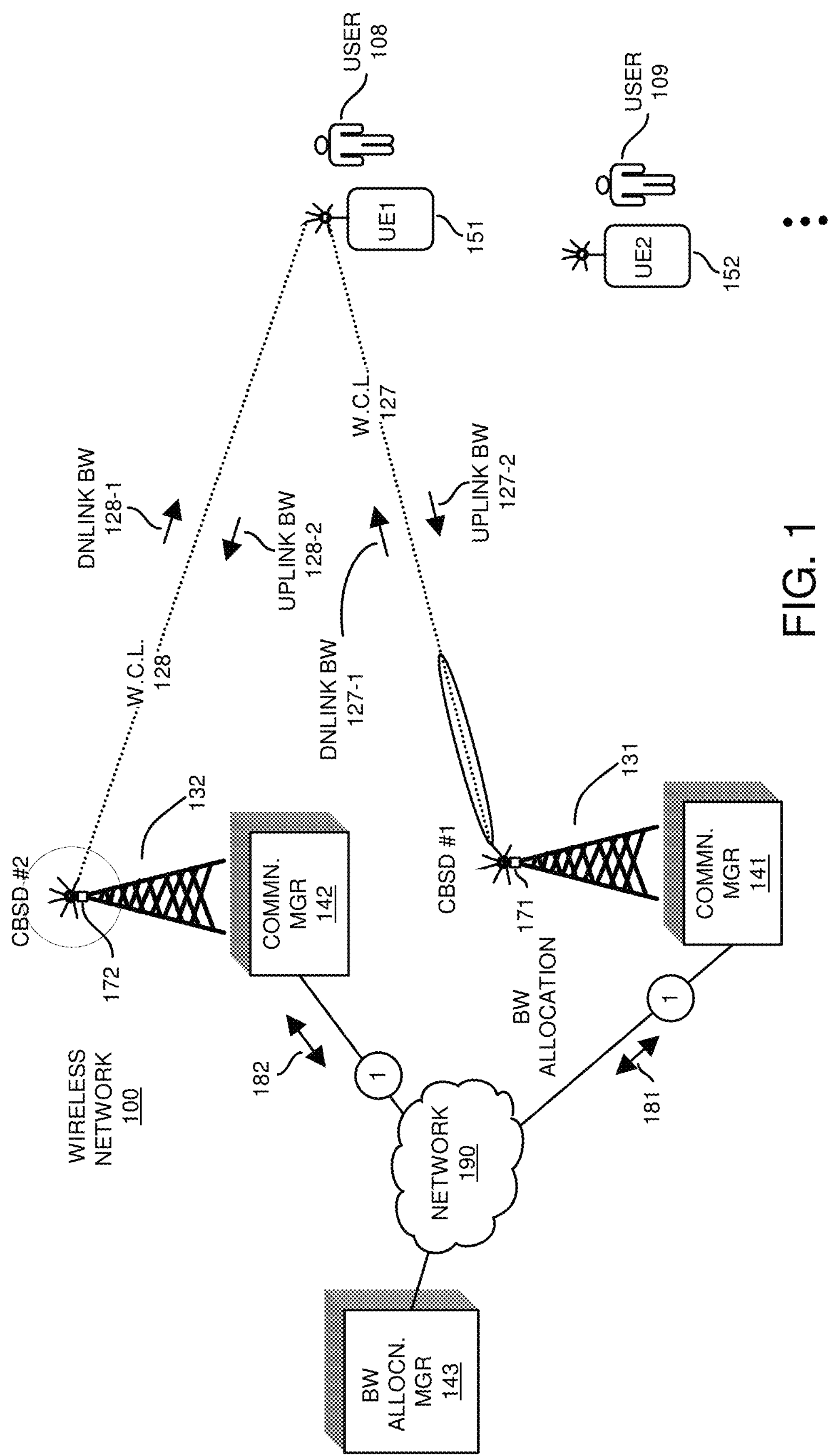
FIG. 1 is an example diagram illustrating a communication network environment and implementation of multiple wireless base stations supporting wireless connectivity of a mobile communication device to a remote network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, with reference to the drawings, FIG. 1 is an example diagram illustrating a communication network environment and multiple wireless stations providing wireless connectivity to a mobile communication device according to embodiments herein.

As shown, network environment 100 includes any number of wireless stations including wireless base station 131 (a.k.a., a first wireless station), wireless base station 132 (a.k.a., a second wireless station), mobile communication device 151, mobile communication device 152, etc.

Network environment 100 further includes network 190, and bandwidth allocation manager 143.

Each of the wireless base stations and mobile communication devices 151, 152, etc., includes a respective communication management resource to perform operations as described herein.

For example, wireless station 131 includes communication management resource 141 that manages wireless communications between the wireless station 131 and the mobile communication device 151; wireless station 132 includes communication management resource 142 that manages wireless communications between the wireless station 132 and the mobile communication device 151, and so on.

Note that the communication management resources as described herein can reside at any suitable location. For example, the communication management resource 141 can be located at the wireless station 131 or a disparate location with respect to the wireless station 131; the communication management resource 142 can be located at the wireless station 132 or a disparate location with respect to the wireless station 132; the communication management resource associated with the mobile communication device 151 can be located at the wireless station 131 or located at a disparate location with respect to the wireless station 131; and so on.

As further shown, user 108 operates mobile communication device 151 to communicate over respective wireless communication link 127 and wireless communication link 128.

Each of the wireless communication links 127 and 128 supports conveyance of data originating in network 190 to the mobile communication device 151; each of the wireless communication links 127 and 128 also supports conveyance of data from the mobile communication device 151 to a target resource in network 190.

Note that each of the resources in network environment 100 can be configured to include or be configured as appropriate hardware, software, or combination of hardware and software to carry out respective operations as discussed herein.

More specifically, the wireless station 131 as described herein can be implemented via respective wireless station hardware, wireless station software, or a combination of wireless station hardware and wireless station software; the communication management resource 141 as described herein can be implemented via respective communication management hardware, communication management software, or a combination of communication management hardware and communication management software; wireless station 132 as described herein can be implemented via respective wireless station hardware, wireless station software, or a combination of wireless station hardware and wireless station software; the communication management resource 142 as described herein can be implemented via respective communication management hardware, communication management software, or a combination of communication management hardware and communication management software.

Bandwidth allocation manager 143 as described herein can be implemented via respective bandwidth allocation manager hardware, bandwidth allocation manager software, or a combination of bandwidth allocation manager hardware and bandwidth allocation manager software.

Mobile communication device 151 or 152 as described herein can be implemented via respective mobile communication device hardware, mobile communication device software, or a combination of mobile communication device hardware and mobile communication device software.

The first wireless station 131 and the second wireless station 132 can be implemented to support any suitable wireless communication protocol. In one embodiment, the first wireless base station is a first CBSD (Citizens Broadband radio Service Device) supporting 5G wireless communications; the second wireless base station is a second CBSD (Citizens Broadband radio Service Device) supporting 4G wireless communications.

One or more spectrum access systems such as bandwidth allocation manager 143 or other suitable entity that allocates use of wireless bandwidth to the first wireless station 131, the second wireless station 132, the mobile communication device 151, etc.

The bandwidth allocation manager 143 can be implemented in any suitable manner. For example, in one embodiment, the bandwidth allocation manager 143 (such as a channel/spectrum allocation management resource) is or includes a Spectrum Access System that allocates one or more wireless channels to entities such as wireless station 131, wireless station 132, mobile communication device 151, mobile communication device 152, etc., in the network environment 100.

In accordance with further example embodiments, the one or more wireless channels (wireless bandwidth) allocated for use by the wireless stations in the network environment are allocated by the bandwidth allocation manager 143 from a tiered wireless communication hierarchy (FIG. 9) in which an incumbent user (such as the government) is ranked higher in priority than the wireless base station 131.

For example, referring again to FIG. 1, in one non-limiting example embodiment, the bandwidth allocation manager 143 allocates bandwidth to the wireless base station 131 from a so-called CBRS (Citizens Band Radio System) band operating between 3.550 and 3.700 GHz (GigaHertz) (such as 150 MegaHertz or 15 wireless channels that are each 10 MHz wide).

Note further that the wireless bandwidth allocated by the bandwidth allocation manager 143 to support the first wireless communication link 127-1 and the second wireless communication link 127-2 can be allocated in any suitable manner. For example, in one embodiment, the first wireless station 131 and the second wireless station 132 communicate with a bandwidth allocation manager 143 (such as spectrum access system) for allocation of wireless bandwidth to support the first wireless communication link 127-1 and the second wireless communication link 127-2.

As previously discussed, the wireless stations can be configured to support any suitable one or more wireless communication protocols facilitate connectivity of the mobile communication devices to the remote network 190.

More specifically, in one non-limiting example embodiment, the first wireless communication link 127-1 is established between the first wireless base station 131 and the mobile communication device 151 in accordance with a 5G wireless communication protocol. In such an instance, the first wireless communication link 127-1 supports 5G wireless communications. The second wireless communication link 127-2 is established between the second wireless base station 131 and the mobile communication device 151 in accordance with a 4G wireless communication protocol. In such an instance, the second wireless communication link 127-2 supports 4G wireless communications.

As further discussed herein, the wireless station 131 includes antenna hardware 171 to transmit wireless communications in a downstream (downlink) direction from the wireless station 131 to one or more mobile communication devices (such as mobile communication device 151, mobile communication device 152, etc.). The wireless station 131 includes antenna hardware 171 to receive wireless communications in an upstream (uplink) direction over wireless communication link 127-1 from the mobile communication devices (such as mobile communication device 151, mobile communication device 152, etc.).

The wireless station 132 includes antenna hardware 172 to transmit wireless communications in a downstream (downlink) direction from the wireless station 132 to one or more mobile communication devices (such as mobile communication device 151, mobile communication device 152, etc.). The wireless station 132 includes antenna hardware 172 to receive wireless communications in an upstream (uplink) direction over wireless communication link 127-2 from the mobile communication devices (such as mobile communication device 151, mobile communication device 152, etc.).

In further example embodiments, in accordance with a so-called dual connect mode, the mobile communication device 151 establishes wireless communication links 127 and 128 for simultaneous use to access the remote network 190.

Each of the wireless stations supports any suitable beam pattern. For example, in one embodiment, the antenna hardware 171 produces a single narrow beam to communicate with mobile communication device 151.

In one embodiment, the antenna hardware 172 produces a single broad or wide beam to communicate with multiple mobile communication devices 151, 152, etc.

Further in this example embodiment, the communication management resource 141 associated with wireless station 131 establishes a first wireless communication link 127 between the first wireless station 131 and the mobile communication device 151. In one embodiment, as previously discussed, the antenna hardware 171 is configured to support a single narrow beam to each of the different mobile communication devices. Prior to establishing the wireless communication link 127, via communications 181, the communication management resource 141 communicates (such as registers) with the bandwidth allocation manager 143 for allocation of wireless resources to communicate with the mobile communication device 151. Via communications 181, the communication management resource 141 associated with wireless base station 131 receives allocation of wireless bandwidth (such as one or more channels) in which to come with the mobile communication device 151.

The communication management resource 142 associated with the wireless station 132 establishes a wireless communication link 128 between the wireless station 132 and the mobile communication device 151. In one embodiment, the antenna hardware 172 is configured to support a single narrow beam, wide beam, omni-directional beam, etc., to support wireless communications with one or more mobile communication devices in network environment 100. Prior to establishing the wireless communication link 128, via communications 182, the communication management resource 142 communicates (such as registers) with the bandwidth allocation manager 143 for allocation of wireless resources to communicate with the mobile communication device 151. More specifically, via communications 182, the communication management resource 142 receives allocation of wireless bandwidth (such as one or more channels) in which to come with the mobile communication device 151.

Via allocated bandwidth such as one or more wireless channels, the downlink bandwidth 127-1 supports communications in a downlink direction from the wireless station 131 over the wireless communication link 127 to the mobile communication device 151. Via allocated bandwidth such as one or more wireless channels, the uplink bandwidth 127-2 supports communications in an uplink direction from the mobile communication device 151 over the wireless communication link 127 to the wireless station 131.

Further in this example embodiment, via allocated bandwidth such as one or more wireless channels, the downlink bandwidth 128-1 supports communications in a downlink direction from the wireless station 132 over the wireless communication link 128 to the mobile communication device 151. Via allocated bandwidth such as one or more wireless channels, the uplink bandwidth 128-2 supports communications in an uplink direction from the mobile communication device 151 over the wireless communication link 128 to the wireless station 131.

As previously discussed, the mobile communication device 151 (such as user equipment UE1) simultaneously uses both of the wireless communication link 127-1 and 127-2 (such as simultaneously or one after the other) to retrieve data from or transmit data to one or more servers in the network 190.

Note that the allocation of bandwidth and corresponding one or more channels to the wireless stations is subject to change. For example, in one embodiment, the communication management resource 141 receives notification of the second wireless communication link 128 between the second wireless station 132 and the mobile communication device 151. As further discussed herein, in response to loss of bandwidth (such as loss of downlink bandwidth) over the second wireless communication link 128 to convey wireless communications from the wireless base station 132 to the mobile communication device 151, the communication management resource 141 adjusts usage of the first wireless communication link 127 to accommodate the loss of bandwidth.

Figure 2:
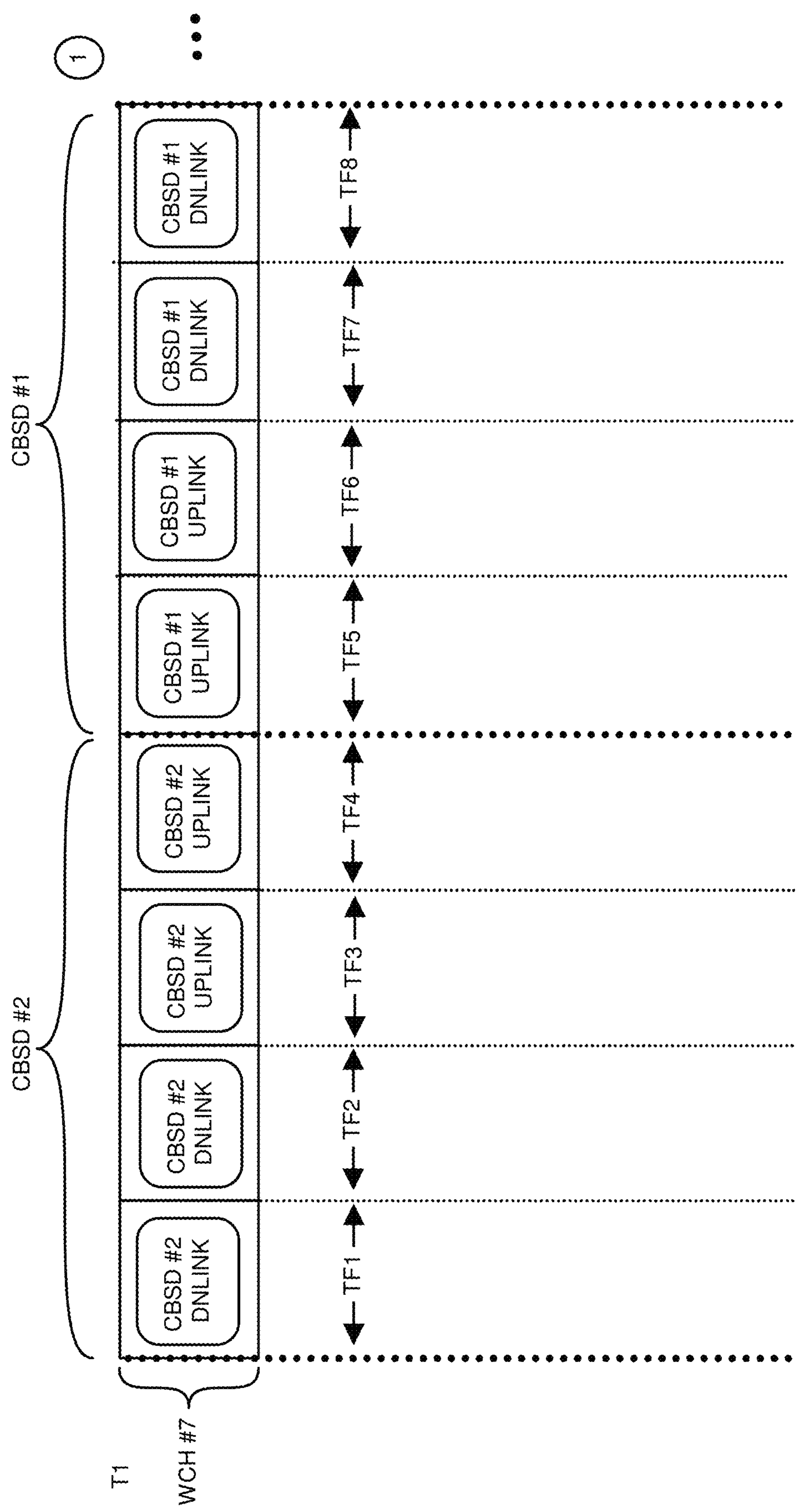
FIG. 2 is an example diagram illustrating initial allocation of wireless bandwidth and timeframes to support uplink and downlink communications via multiple wireless communication links according to embodiments herein.

FIG. 2 is an example diagram illustrating initial allocation of wireless bandwidth and timeframes to support uplink and downlink communications via multiple wireless communication links according to embodiments herein.

Via operation #1, the bandwidth allocation manager 143 initially allocates use of bandwidth (such as one or more wireless channels) so that both wireless communication links 127 and 128 support uplink and downlink communications. Portions of the available bandwidth and corresponding timeframes (such as timeslots) are allocated to support uplink and downlink communications for each wireless communication link.

More specifically, assume that the bandwidth allocation manager 143 allocates use of wireless channel #7 for use by the wireless stations (wireless base station 131 and wireless base station 132) and mobile communication devices (such as mobile communication device 151. In such an instance, the communication management resources 141 and 142 coordinate shared use of wireless channel #7 to support wireless communications associated with the mobile communication device 151. In one embodiment, the wireless stations implement a listen before talk function to acquire (such as for a predetermined amount of time such as 10 milliseconds or other suitable value) the wireless channel #7 before communicating in respective timeframes.

Subsequent to acquisition, one or more of the communication management resource 141, communication management resource 142, bandwidth allocation manager, or other suitable entity: i) allocates timeframes TF1 and TF2 of wireless channel #7 at time T1 to support downlink communications over the wireless communication link 128 from the wireless station 132 to the mobile communication device 151, ii) allocates timeframes TF3 and TF4 of wireless channel #7 at time T1 to support uplink communications over the wireless communication link 128 from the mobile communication device 151 to the wireless station 132, iii) allocates timeframes TF5 and TF6 of wireless channel #7 at time T1 to support uplink communications over the wireless communication link 127 from the wireless station 131 to the mobile communication device 151, iv) allocates timeframes TF7 and TF8 of wireless channel #7 at time T1 to support downlink communications over the wireless communication link 127 from the mobile communication device 151 to the wireless station 131.

In one embodiment, the configuration of allocated timeslots (timeframes) associated with shared wireless channel #7 (allocated to both wireless stations 131 and 132) is a repetitive cycle of allocating different portions of uplink and downlink bandwidth (timeframes) for each of wireless communication link 127 and 128. The configuration support 50% uplink bandwidth and 50% downlink bandwidth in the wireless communication link 127 and 50% uplink and 50% downlink bandwidth in the wireless communication link 128.

Assume that the communication system as described herein implements the allocation of bandwidth over each of multiple cycles to provide the mobile communication device 151 both uplink and downlink bandwidth over each of the wireless communication links 127 and 128 over time. In such an instance, the mobile communication device 151 simultaneously uses both communication links to transmit and receive data.

Note that the apportionment (percentage) of uplink and downlink bandwidth allocated for each resource can vary over time.

Figure 3:
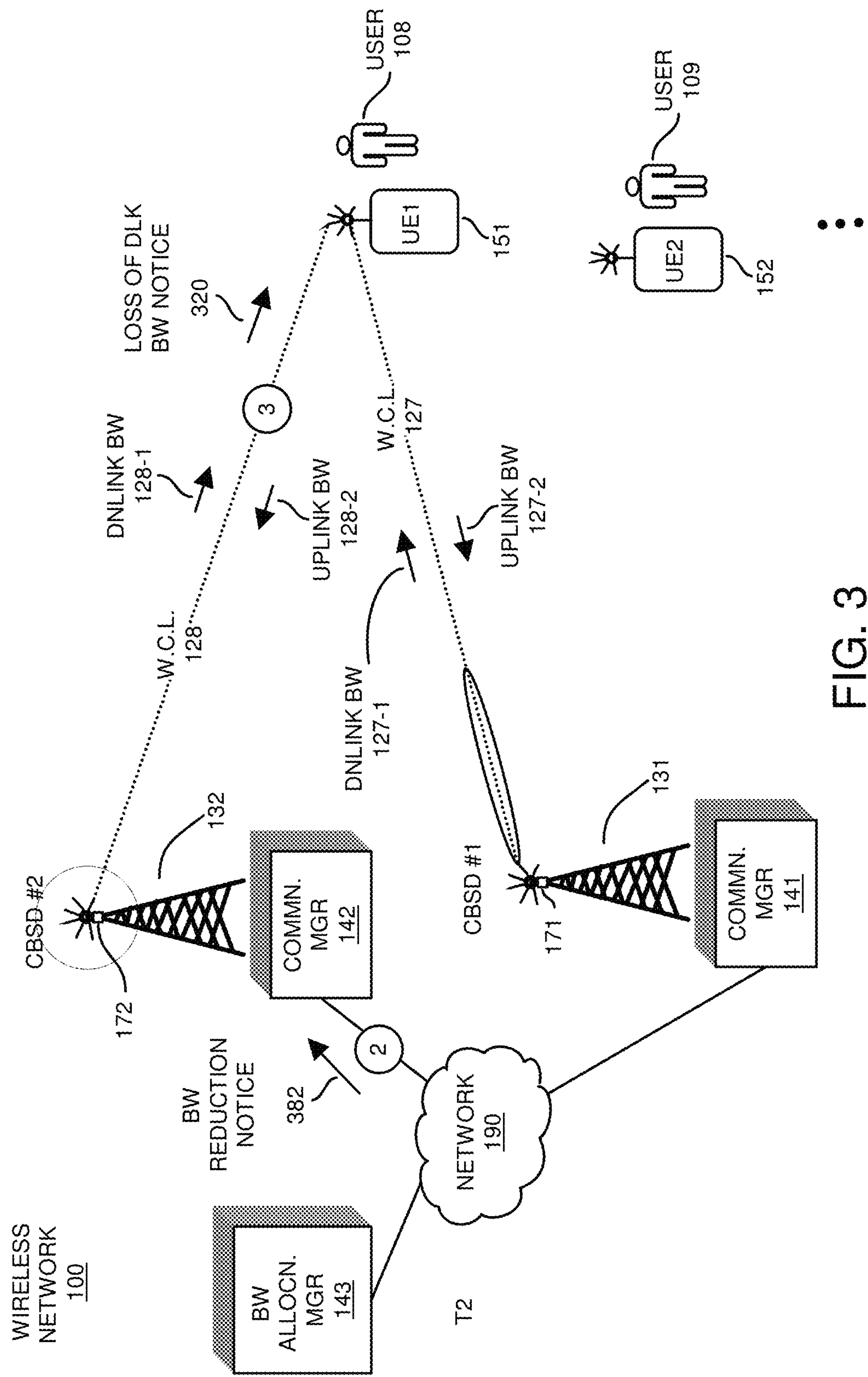
FIG. 3 is an example diagram illustrating notification of a reduction in allocated wireless bandwidth according to embodiments herein.

FIG. 3 is an example diagram illustrating notification of a reduction in bandwidth over one wireless communication link according to embodiments herein.

Assume in this example embodiment that a trigger event occurs in which the wireless station 132 and communication manager 142 are forced to reduce an amount of bandwidth used to communicate in the downlink direction from the wireless station 132 over the wireless communication link 128 to the mobile communication device 151. The trigger event can be any condition such as decision by the bandwidth allocation manager 143 to reduce allocated bandwidth, wireless interference in the network environment 100 preventing communications on the downlink from the wireless station 132 to the mobile communication device 151, etc.

The amount of bandwidth reduction can vary depending on the embodiment from a partial reduction to a full reduction in the downlink bandwidth 128-1. In one embodiment, the bandwidth reduction is partial reduction of wireless bandwidth to communicate from antenna hardware 172 to the mobile communication device 151; alternatively, bandwidth reduction is complete termination of wirelessly communicating from antenna hardware 172 to the mobile communication device 151.

In still further example embodiments, in operation #2, in response to a trigger event, assume that the bandwidth allocation manager 143 provides notification (such as via communications 382) of the downlink bandwidth reduction associated with wireless communication link 128 to one or more of wireless station 132 and wireless station 131.

In response to receiving the bandwidth reduction notice 382, via further communication of message 320 to the mobile communication device 151, the second wireless base station 132 notifies the mobile communication device 151 of the impairment (such as loss of downlink bandwidth) associated with the second wireless communication link 128 to convey the wireless communications.

Figure 4:
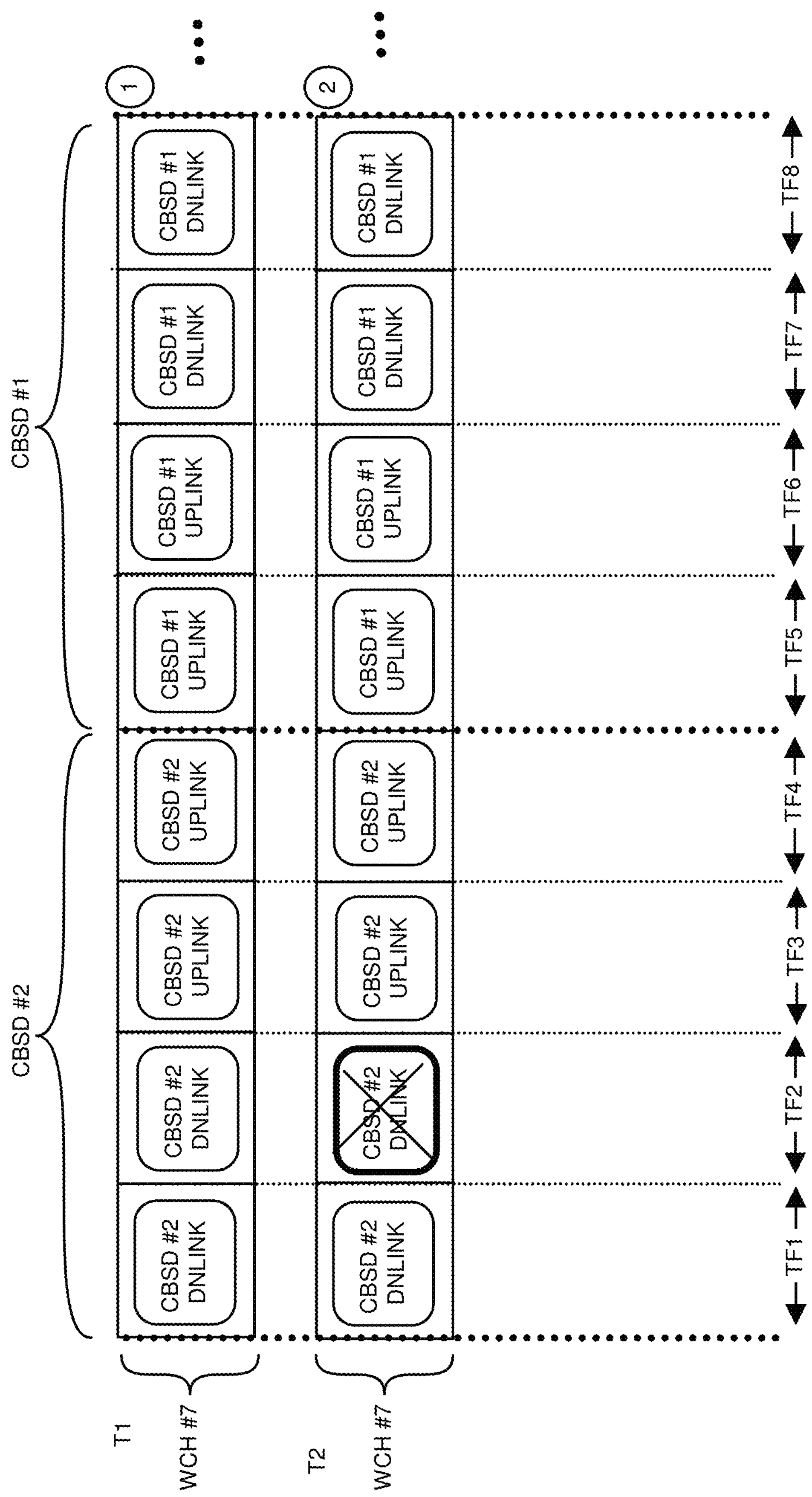
FIG. 4 is an example diagram illustrating a change in allocation of wireless bandwidth and timeframes to support uplink and downlink communications via multiple wireless communication links according to embodiments herein.

Following FIG. 4 illustrates de-allocation of downlink bandwidth such as associated with timeframe TF2 and reduced use of antenna hardware 172 to communicate in the downlink direction to the mobile communication device 151 in response to the trigger event.

FIG. 4 is an example diagram illustrating a change in allocation of wireless bandwidth and timeframes to support uplink and downlink communications via multiple wireless communication links according to embodiments herein.

As previously discussed, the impairment of the second wireless communication link 128 includes a reduced ability (such as loss of bandwidth associated with downlink bandwidth 128-1) of the second wireless communication link 128 to convey communications from the second wireless base station 132 in a downlink direction from the second wireless base station 132 to the mobile communication device 151. In accordance with one embodiment, as shown in FIG. 4, the bandwidth loss is depicted as the deallocation and termination of using timeframe TF2 in wireless channel #7 to support downlink communications.

Figure 5:
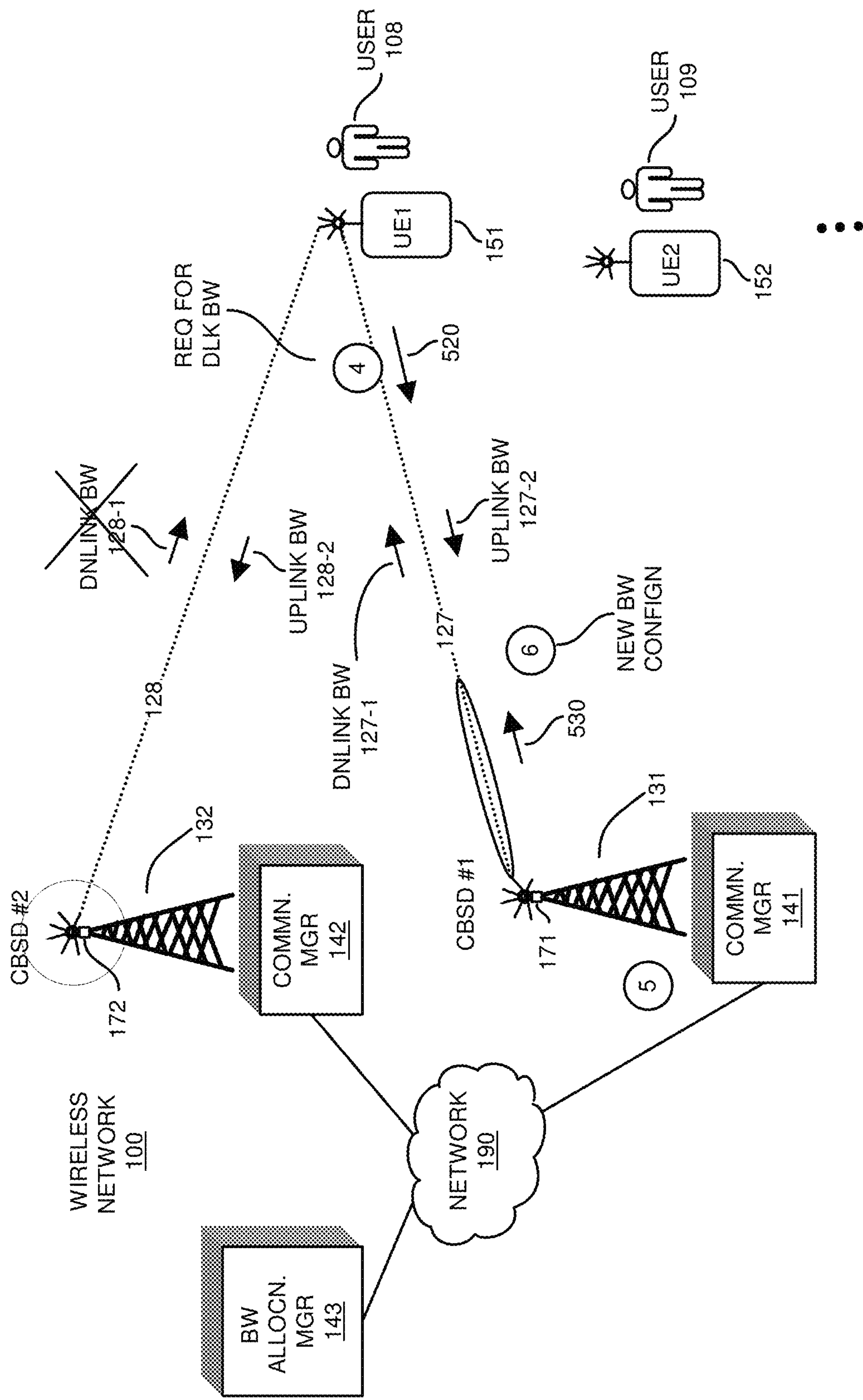
FIG. 5 is an example diagram illustrating request for downlink bandwidth and notification of a new downlink configuration according to embodiments herein.

FIG. 5 is an example diagram illustrating notification of a new downlink configuration according to embodiments herein.

Further embodiments herein include increasing the amount of downlink bandwidth 127-1 allocated to communicate in a downlink direction from the first wireless base station 131 to the mobile communication device 151 to accommodate loss of bandwidth in the second wireless communication link 128 from the wireless station 132 to the mobile communication device 151.

For example, in one embodiment, as previously discussed, via communications 320, the mobile communication device 151 receives notification of bandwidth loss (all or a portion of wireless service) associated with the downlink bandwidth 128-1 from the wireless station 132 to convey downlink communications from the wireless station 132 to the mobile communication device over the wireless communication link 128.

Further embodiments herein include, at the first wireless base station 131 as shown in FIG. 5, receiving a message 520 over the first wireless communication link 127 from the mobile communication device 151. The message 520 is a request to change an amount of downlink bandwidth or allocated frames over the first wireless communication link from the first wireless base station 131 to the mobile communication device 151 to accommodate the loss of all or a portion of downlink bandwidth 128-1.

Figure 6:
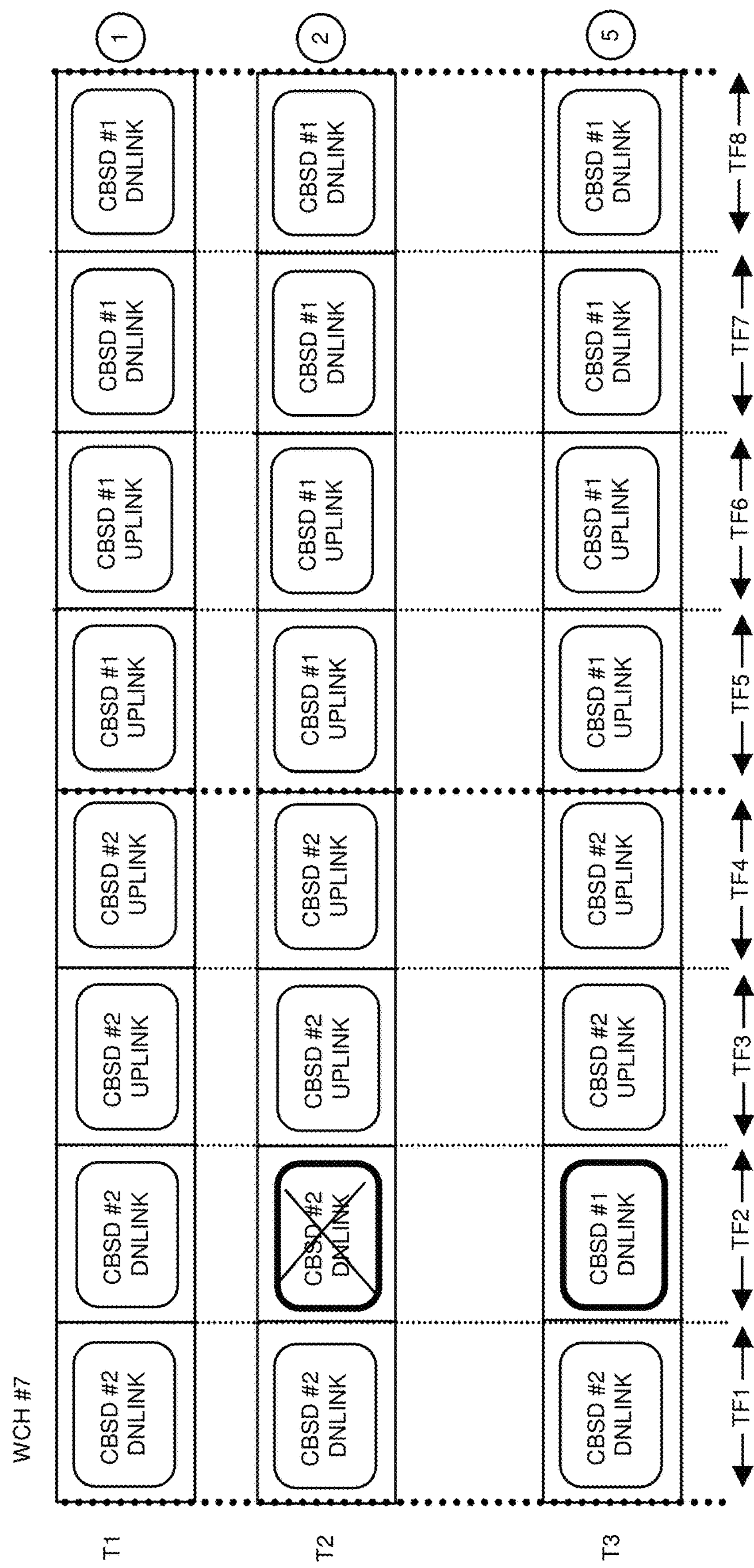
FIG. 6 is an example diagram illustrating updated allocation of wireless bandwidth and timeframes to support uplink and downlink communications via multiple wireless communication links according to embodiments herein.

In one embodiment, as further shown in FIG. 6, in response to receiving the message 520, the communication management resource 141 of the wireless station 131 allocates downlink bandwidth 128-2 (in timeframe TF2) associated with the wireless communication link 127 and corresponding future use of the configuration of implementing wireless channel #7 for conveying control information/data associated with the lost bandwidth.

FIG. 6 is an example diagram illustrating updated allocation of wireless bandwidth and timeframes to support uplink and downlink communications via multiple wireless communication links according to embodiments herein.

As previously discussed, via operation #1, the bandwidth allocation manager 143 initially allocates use of bandwidth (such as one or more wireless channels) so that both wireless communication links 127 and 128 support uplink and downlink communications. Portions of the available bandwidth of one or more channels and corresponding timeframes are allocated to support uplink and downlink communications for each wireless communication link.

For example, as previously discussed, timeframes TF1 and TF2 of wireless channel at time T1 are allocated to support downlink communications over the wireless communication link 128 from the wireless station 132 to the mobile communication device 151; timeframes TF3 and TF4 of wireless channel at time T1 are allocated to support uplink communications over the wireless communication link 128 from the mobile communication device 151 to the wireless station 132; timeframes TF5 and TF6 of wireless channel at time T1 are allocated to support uplink communications over the wireless communication link 127 from the wireless station 131 to the mobile communication device 151; timeframes TF7 and TF8 of wireless channel at time T1 are allocated to support downlink communications over the wireless communication link 127 from the mobile communication device 151 to the wireless station 131.

Operation #2 (such as any trigger event causing the loss of all or a portion of downlink bandwidth 128-1) results in a bandwidth loss and an inability or lowered ability of the wireless station 132 to wirelessly communicate in a downlink direction from the wireless station 132 to the mobile communication device 151. This is depicted as loss bandwidth in timeframe TF2 of wireless channel to communicate from the wireless station 132 over wireless communication link 128 to the mobile communication device 151.

In this example embodiment, in response to the loss bandwidth trigger event and loss bandwidth, the communication management resource 141 (and/or bandwidth allocation manager 143, communication management resource 142) adjusts usage of the first wireless communication link 127 and corresponding allocated downlink bandwidth to support the second wireless communication link.

More specifically, in one embodiment, as shown in operation #5, the adjustment includes allocating a portion of available bandwidth such as timeframe TF2 of the timeframe configuration to the wireless base station 131 to support downlink communications associated with the second wireless base station 132 over the first wireless communication link 127 from the first wireless base station 131 to the mobile communication device 151.

In other words, instead of using the bandwidth portion timeframe TF2 associated with the configuration at time T3 to communicates in a downlink direction from the wireless station 132 to the mobile communication device 151, the wireless station 131 communicates downlink communications associated with the wireless communication link 128 over the wireless communication link 127 to the mobile communication device 151 in timeframe TF2. In such an instance, the wireless station 132 is still able to support receiving uplink communications over the wireless communication link 127 from the mobile communication device 151 even though the downlink associated with the wireless communication link 128 is reduced.

Thus, embodiments herein include, via the communication management resources or other suitable entity, supporting downlink communications associated with the second wireless base station 132 over the first wireless communication link 127 from the first wireless base station 131 to the mobile communication device 151 based on increasing an amount of bandwidth allocated to communicate in a downlink direction from the first wireless base station 131 over the first wireless communication link 127 to the mobile communication device 151.

Note that the timeframe TF2 in wireless channel #7 can be configured to carry any suitable information. As previously discussed, the wireless communication link 127 supports communications in accordance with a first wireless communication protocol (such as 5G); the wireless communication link 128 supports communications in accordance with a second wireless communication protocol (such as 4G). In one embodiment, the bandwidth such as timeframe TF2 at time T3 is allocated to support PDCCH (Physical Downlink Control Channel) information in accordance with the second wireless communication protocol (such as 4G). In accordance with further example embodiments, the timeframe TF2 at time T1 carries all DL (downlink) channel information such as which are PDCCH messages, PDSCH (Physical Downlink Shared Channel) messages, PHICH (Physical Hybrid ARQ Indicator Channel) messages, PBCH (Physical Broadcast Channel) message. The uplink time slots TF3 and TF4 associated with wireless channel #7 can be configured to carry all uplink channel information such as PUCCH (Physical Uplink Control Channel) such as control messages, and PUSCH (Physical Uplink Shared Channel) such as data messages.

Thus, at time T3, the timeframe TF2 (such as a 5G DL slot instead of a 4G DL slot) carries all the 4G DL channel information such that the mobile communication device 151 still supports a 4G connection over wireless communication link 128.

Further note that, since the newly 5G DL time slot (such as timeframe TF2 at time T3) carries PDSCH messages (such as user data) to the mobile communication device 151, this helps network to compensate for the throughput loss caused by bandwidth allocation manager 143 terminating use of wireless channel #7 by the wireless station 132. Thus, as described herein, the same 4G DL channels (such as timeframe TF2) can be implemented as a 5G DL time slot using the 5G wireless communication protocol standard.

Figure 7:
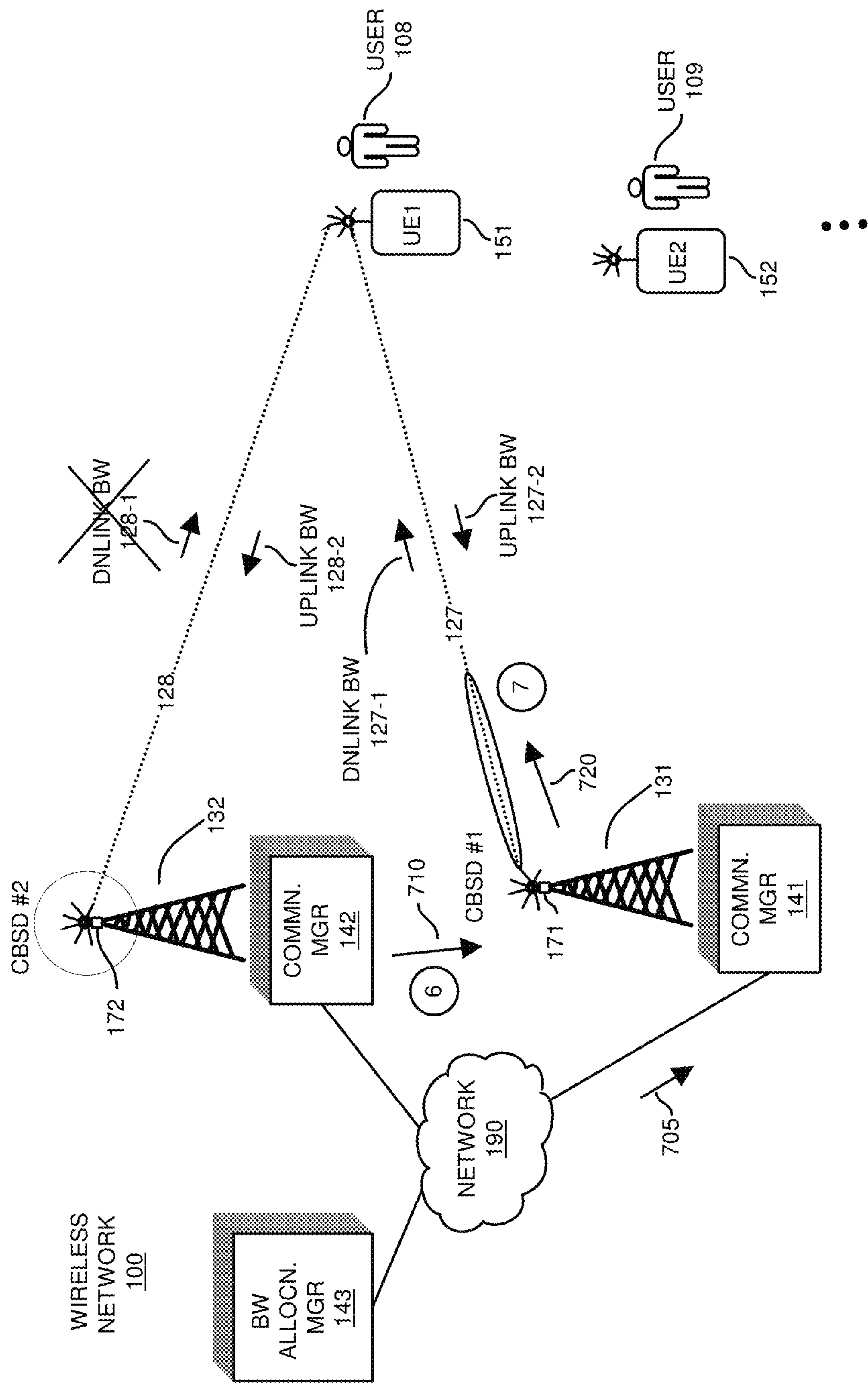
FIG. 7 is an example diagram illustrating implementation of the updated allocation configuration to convey data in a simultaneous dual wireless connection mode using multiple wireless base stations according to embodiments herein.

FIG. 7 is an example diagram illustrating implementation of the updated allocation configuration to convey data according to embodiments herein.

As previously discussed, the communication management resource 141 accepts the request (such as via communications 520) from the mobile communication device 151 (or communication management resource 142) to provide downlink support.

For example, as previously discussed in FIG. 5, via operation #5, the communication management resource 141 accepts the request to provide additional downlink bandwidth and updates the configuration of using wireless channel #7. In accordance with the new bandwidth allocation usage of wireless channel #7, the communication management resource 141 communicates the new DL configuration to mobile communication device 151 (via communications 530) in operation #6.

In furtherance of the new configuration of using the wireless channel #7 as shown in FIG. 7, via communications 710, the communication management resource 142 communicates data (i.e., data that cannot be communicated in the downlink of wireless communication link 128) to the communication management resource 141. The communication management resource 141 receives the data from the communication management resource 142 (or other suitable entity) and forwards the received communications (data destined for delivery to the mobile communication device 151) associated with wireless communication link 128 in the one or more new downlink timeframes allocated on behalf of the 4G connection (such as wireless communication link 128). Thus, the CBSD #1 sends new DL data (such as UE's existing DL data from CBSD #2 if there is unfinished DL data transmission) associated with the 4G connection using the new DL subframe configuration as shown in FIG. 6.

Additionally, subsequent to updating the use of wireless channel #7, note that the mobile communication device 151 can be configured to request new data via communications with one or more servers in the network 190. In one embodiment, the wireless station 131 receives the new data destined for the mobile communication device 151 via communications 705. The wireless base station 131 (such as CBSD #1) communicates the new data as communications 720 to the mobile communication device 151 over the wireless communication link 127. Thus, a requests may be communicated from the mobile communication device 151 over the wireless communication link 128 to the wireless base station 132; the wireless base station 132 forwards the request for content to a target server resource in network 190. In a return direction, the server resource communicates the requested content to wireless base station 132 or wireless base station 131. The wireless base station forwards the received data (such as from wireless base station 132) over wireless communication link 127 in the new downlink to the mobile communication device 151.

Figure 8:
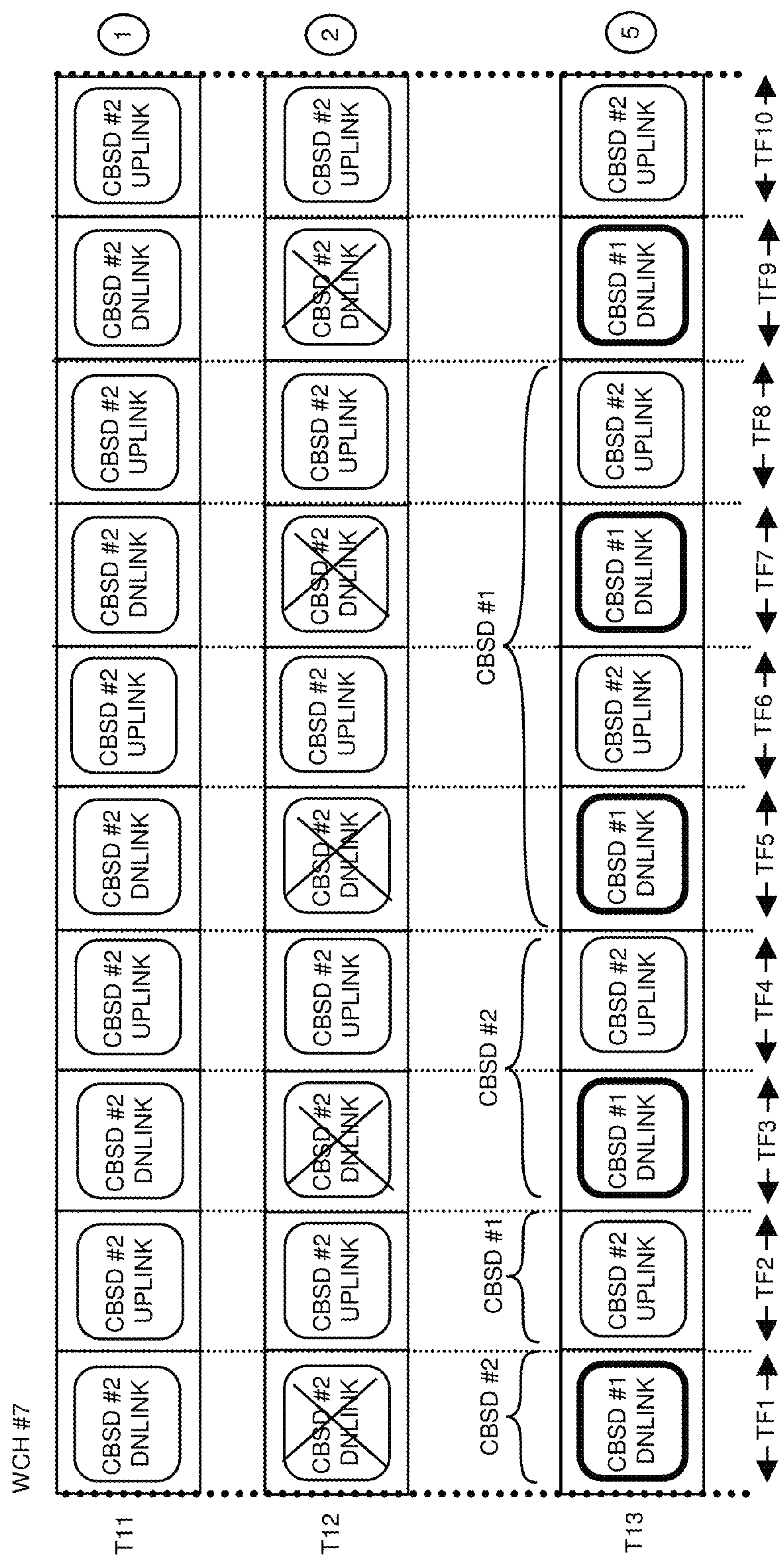
FIG. 8 is an example diagram illustrating loss bandwidth in a downlink over a first wireless communication link and updated allocation of wireless bandwidth and timeframes to support additional communications via a second wireless communication link according to embodiments herein.

FIG. 8 is an example diagram illustrating implementation of the updated allocation configuration to convey data according to embodiments herein.

This example embodiment illustrates complete loss of downlink bandwidth over wireless communication link 128 from the wireless base station 132 to the mobile communication device.

In operation #1, the configuration of the wireless channel #7 is initially split such that 50% of the frame configuration is allocated to support uplink and 50% of the frame configuration is allocated to support downlink communications from wireless base station 132 using wireless communication link 128. For example, at time T11, the channel allocation includes downlink bandwidth in timeframes TF1, TF3, TF5, TF7, and TF9 and uplink bandwidth in timeframes TF2, TF4, TF6, TF8, and TF10.

In this example embodiment, at or around time T12, assume that a trigger event causes a loss of downlink bandwidth associated with the wireless communication link 128 and current timeframe configuration at T11. This can include the wireless base station 132 and corresponding communication management resource 142 receiving notification of bandwidth loss from the bandwidth allocation manager 143. In such an instance, the downlink bandwidth associated with wireless communication link 128 is no longer available as depicted in operation #2 in FIG. 8.

In operation #5, in a similar manner as previously discussed, to accommodate the loss of downlink bandwidth on the wireless communication link 128, embodiments herein include modifying the frame configuration as shown.

For example, because the downlink bandwidth is not available on wireless communication link 128 to the mobile communication device 151, the frame configuration is updated such that the timeframes TF1, TF3, TF5, TF7, and TF9 are allocated to wireless downlink communications from the wireless base station 131 to the mobile communication devices 151 as a substitute to the lost downlink bandwidth associated with the wireless communication link 128. Based on the updated frame configuration at operation #5 and corresponding implementation, the wireless communication link 127 supports downlink communications from the wireless base station 131 to the mobile communication device 151 to accommodate the uplink communications from the mobile communication device 151 to the wireless base station 132.

Figure 9:
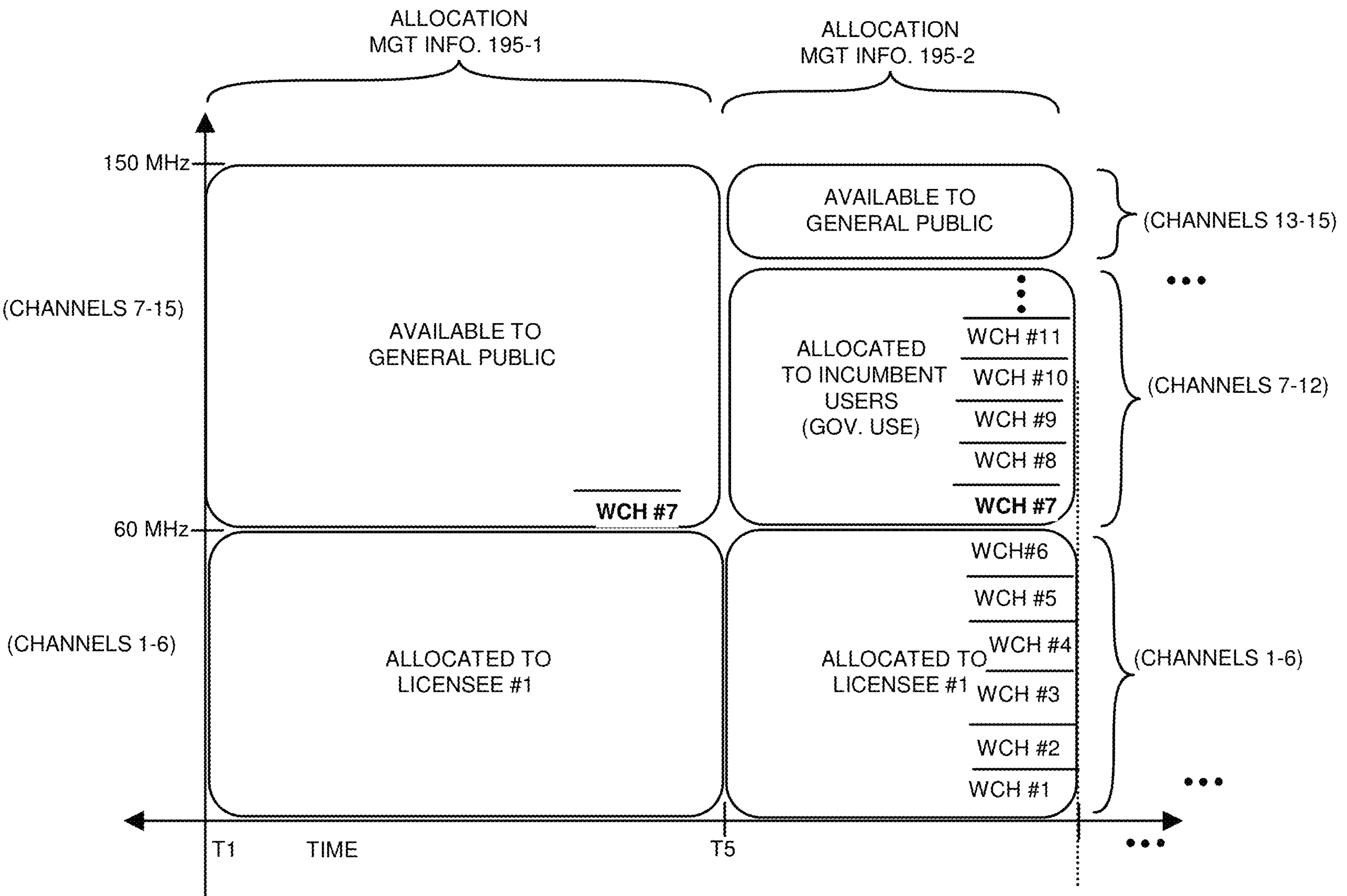
FIG. 9 is an example diagram illustrating generation of dynamic channel allocation information indicating allocation of bandwidth at different tiers of a channel hierarchy according to embodiments herein.

FIG. 9 is an example diagram illustrating generation of dynamic channel allocation information indicating allocation of bandwidth at different tiers of a channel hierarchy according to embodiments herein.

As previously discussed, bandwidth allocation manager 143 can be configured to allocate any suitable type of wireless spectrum (bandwidth, wireless channels, etc.) for use by the communication devices such as wireless station 131, wireless station 132, mobile communication device 151, mobile communication device 152, etc., in the network environment 100.

In one non-limiting example embodiment, the communication management resource 140 allocates bandwidth (wireless channels) for use by the wireless stations (such as wireless station 131, wireless station 132, . . . , mobile communication device 151, mobile communication device 152, etc.) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, bandwidth allocation manager 143 (such as spectrum access system, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 195-2 as shown in FIG. 9.

More specifically, in this example, the bandwidth allocation information 195-1 (a first instance of bandwidth allocation information) indicates that between time T1 and time T5, channels 7-15 are available to the general authorized access users (general public or low priority users) for use; channels 1-6 are available for use by licensee #1. In a manner as previously discussed, the channels 1-6 (more specifically, WCH #1, WCH #2, WCH #3, WCH #4, WCH #5, WCH #6) are allocated for use by the wireless stations in network environment 100 that are entitled to use the licensed spectrum.

Assume that the wireless station 131, wireless station 132, and mobile communication device 151 acquire use of wireless channel #7 to support communications in a manner as previously discussed.

As further shown, at or around time T5, assume that the management resource 143 receives input indicating use of a portion (channels 7-12) of the spectrum by an incumbent user such as the government. In such an instance, the allocation management resource 140 updates the channel allocation information such that the bandwidth allocation information 195-2 indicates that only channels 13-15 are allocated as being available to the general authorized access users (unlicensed portion of the spectrum); channels 7-12 are assigned for use by an incumbent entity requesting use or actually using the channels; wireless channels 1-6 are still allocated for use by a first licensee. Thus, after time T5, the wireless channels 7-12 are no longer available for use by the lower priority users (i.e., general authorized access users) such as wireless station 131, wireless station 132, etc.

Assume that the bandwidth allocation manager 143 allocates the wireless station 131, wireless station 132, mobile communication device 151, etc., use of the wireless channel #7 to support wireless communications. In one embodiment, in response to revocation of the allocation of wireless channels 7-12, the bandwidth management resource 143 notifies the wireless station 131, wireless station 132, etc., at or around time T5 that the wireless channel #7 is no longer available for use because the bandwidth allocation manager 143 revokes and assigns the channels to the incumbent user.

Thus, between time T1 and time T5, the wireless station 131, wireless station 132, etc., are allocated use of the wireless channel #7 to provide wireless service to the communication devices 151, 152, etc., in a manner as previously discussed. At or around time T5, the bandwidth allocation manager 143 deallocates use of the wireless channel #7.

This illustrates the dynamic availability of different wireless channels bandwidth in a bandwidth hierarchy as shared in network environment 100. For example, if bandwidth allocation manager 143 allocates use of wireless channels #7-12 in the hierarchy of available channels to any of one or more base stations, communication devices, etc., then the bandwidth allocation manager 143 must de-allocate use of such wireless channels during conditions in which a higher priority so-called incumbent user relinquishes use of wireless channels 7-12 at or around time T5. In such an instance, as previously discussed, the bandwidth allocation manager 143 deallocates the wireless channels 7-12 from respective wireless stations for use instead by the incumbent user (higher priority user).

In accordance with further embodiments, as previously discussed, the bandwidth allocation manager 143 may allow wireless base station 131 to continue use of wireless channel #7 while the bandwidth allocation manager 143 may deallocate use of wireless channel #7.

Figure 10:
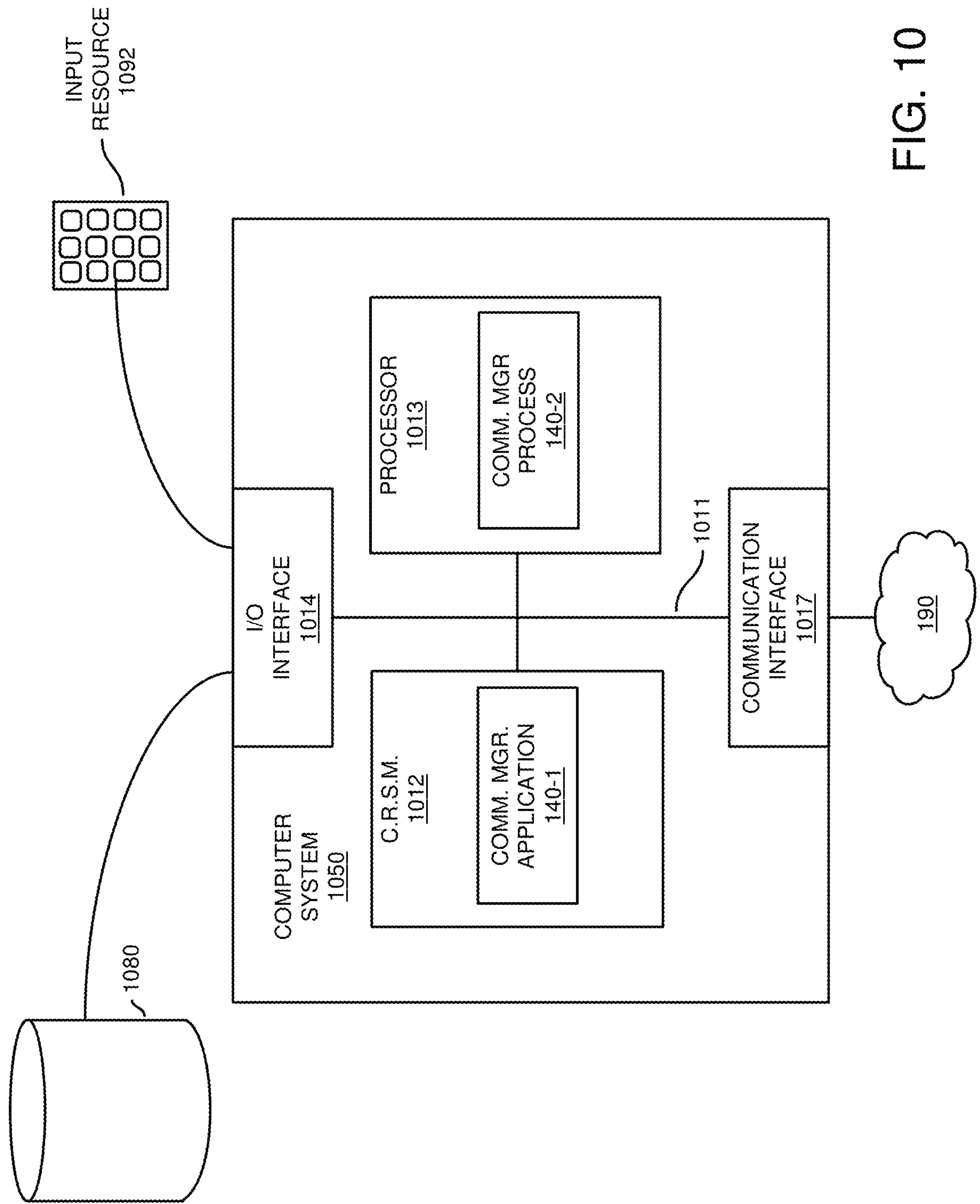
FIG. 10 is an example diagram illustrating example computer architecture operable to execute one or more operations according to embodiments herein.

FIG. 10 is an example block diagram of a computer system for implementing any of the operations as discussed herein according to embodiments herein.

Any of the resources (such as communication management resource 140, wireless base station 131, wireless base station 132, communication management resource 142, mobile communication device, etc.) as discussed herein can be configured to include a respective instantiation of computer processor hardware and corresponding executable instructions to carry out the different operations as discussed herein. For example, each of communication manager 141 and communication manager 142 can be configured to execute different instances of the communication manager application 140-1 to execute operations as described herein.

As shown, computer system 1050 of the present example includes an interconnect 1011 that couples computer readable storage media 1012 such as a non-transitory type of media (i.e., any type of hardware storage medium) from which digital information is stored and retrieved, a processor 1013, I/O interface 1014, and a communications interface 1017.

I/O interface 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with communication manager application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in communication manager application 140-1 stored on computer readable storage medium 1012. Execution of the communication manager application 140-1 produces management process 140-2 to carry out any of the operations and/or processes as discussed herein.

Those skilled in the art will understand that the computer system 1050 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 11:
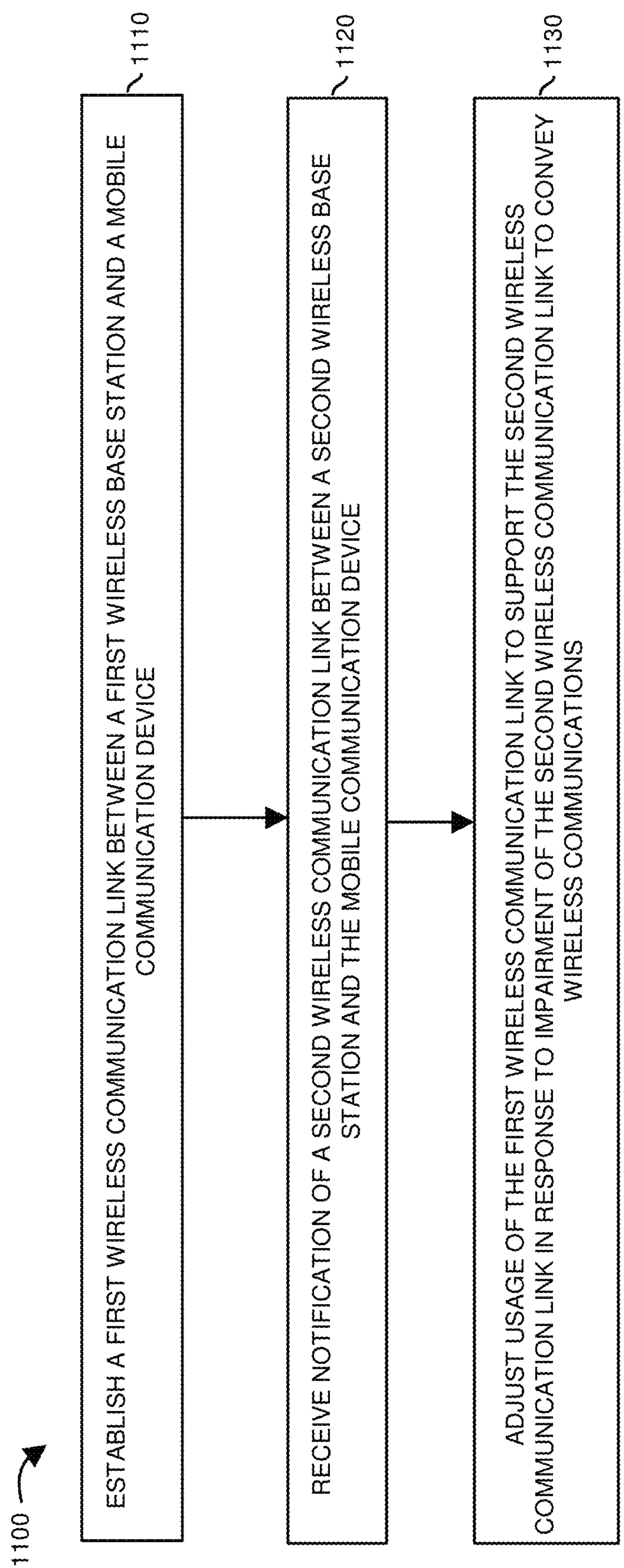
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, the communication management resource 141 associated with wireless station 131 establishes a first wireless communication link 127-1 between the first wireless station 131 and a mobile communication device 151.

In processing operation 1120, the communication management resource 141 receives notification of a second wireless communication link 127-2 between a second wireless station 132 and the mobile communication device 151.

In processing operation 1130, the communication management resource 141 adjusts usage of the first wireless communication link 127-1 in response to loss of bandwidth over the second wireless communication link 127-2 to convey wireless communications.

Note again that techniques herein are well suited to support communications in a wireless network environment via manage allocation of wireless channels in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:

establishing a first wireless communication link between a first wireless base station and a mobile communication device;

receiving notification of a second wireless communication link established between a second wireless base station and the mobile communication device, a combination of the first wireless communication link and the second wireless communication link simultaneously providing the mobile communication device connectivity to a remote network;

detecting a reduction in bandwidth allocated for communicating with the mobile communication device over the second wireless communication link; and adjusting usage of the first wireless communication link in response to the detected reduction in bandwidth over the second wireless communication link.

2. The method as in claim 1, wherein adjusting usage of the first wireless communication link includes:

in response to the reduction in bandwidth allocated for communicating with the mobile communication device over the second wireless communication link, receiving data from the second wireless base station, the data targeted for delivery to the mobile communication device; and communicating the data from the first wireless base station over the first wireless communication link to the mobile communication device.

3. The method as in claim 1, wherein the detected reduction in bandwidth includes a reduced ability of the second wireless communication link to convey communications from the second wireless base station in a downlink direction from the second wireless base station to the mobile communication device.

4. The method as in claim 1, wherein adjusting usage of the first wireless communication link in response to the detected reduction in bandwidth includes:

supporting downlink communications associated with the second wireless base station over the first wireless communication link from the first wireless base station to the mobile communication device.

5. The method as in claim 1, wherein adjusting usage of the first wireless communication link in response to the detected reduction in bandwidth includes: increasing an amount of bandwidth allocated to communicate in a downlink direction from the first wireless base station to the mobile communication device.

6. The method as in claim 1, wherein adjusting usage of the first wireless communication link in response to the detected reduction in bandwidth includes:

transmitting a command from the first wireless base station to the mobile communication device, the command controlling transmission of wireless uplink communications over the second wireless communication link from the mobile communication device to the second wireless base station.

7. The method as in claim 1, wherein the second wireless base station notifies the mobile communication device of the reduction in bandwidth.

8. The method as in claim 1 further comprising:

at the first wireless base station, receiving a message over the first wireless communication link from the mobile communication device, the message requesting a change in allocated downlink bandwidth over the first wireless communication link from the first wireless base station to the mobile communication device, the message received in response to the reduction in bandwidth allocated for communicating with the mobile communication device over the second wireless communication link.

9. The method as in claim 1, wherein adjusting usage of the first wireless communication link includes: in response to detecting the reduction in bandwidth allocated for communication with the mobile communication device over the second wireless communication link, increasing an amount of bandwidth allocated to communicate in a downlink direction from the first wireless base station to the mobile communication device, the increased amount of bandwidth in the downlink direction accommodating the reduction in bandwidth.

10. The method as in claim 1 further comprising:

communicating with a spectrum access system for allocation of supplemental wireless bandwidth to support an increase in bandwidth supporting communications over the first wireless communication link.

11. The method as in claim 10, wherein the second wireless base station is operative to communicate with the spectrum access system for allocation of wireless bandwidth to support the second wireless communication link.

12. The method as in claim 1, wherein the first wireless base station is a first CBSD (Citizens Broadband radio Service Device); and wherein the second wireless base station is a second CBSD (Citizens Broadband radio Service Device).

13. The method as in claim 1, wherein the first wireless communication link is established between the first wireless base station and the mobile communication device in accordance with a 5G wireless communication protocol; and wherein the second wireless communication link is established between the second wireless base station and the mobile communication device in accordance with a 4G wireless communication protocol.

14. The method as in claim 1, wherein the first wireless base station implements a first wireless beam width to support the first wireless communication link between the first wireless base station and the mobile communication device; and wherein the second wireless base station implements a second wireless beam width to support the second wireless communication link between the second wireless base station and the mobile communication device, the second beam width different than the first beam width.

15. The method as in claim 1, wherein the first wireless base station is allocated use of a first wireless channel to establish the first wireless communication link; and wherein the second wireless base station is allocated use of the first wireless channel to establish the second wireless communication link.

16. The method as in claim 15, wherein the first wireless channel is partitioned to include repetitive cycles of timeslots; and wherein portions of the cycles of timeslots are dynamically allocated to support the first wireless communication link and the second wireless communication link.

17. The method as in claim 16, wherein the repetitive cycles include a first cycle and a second cycle; and wherein a first portion of timeslots in the first cycle are allocated to support the second wireless communication link, the first portion of timeslots being greater than a second portion of timeslots in the second cycle allocated to support the second wireless communication link; and wherein the reduction in the bandwidth allocated for communicating with the mobile communication device over the second wireless communication link is a decrease in allocation from the first portion of timeslots to the second portion of timeslots.

18. The method as in claim 17, wherein adjusting the usage of the first wireless communication link includes:

increasing a number of timeslots allocated to the first wireless communication link from the first cycle to a third cycle of the repetitive cycles of timeslots.

19. The method as in claim 1, wherein the reduction in the bandwidth allocated for use by the mobile communication device over the second wireless communication link is a decrease in a number of timeslots of a first wireless channel allocated for use by the second wireless communication link over time.

20. The method as in claim 19, wherein adjusting the usage of the first wireless communication link includes:

increasing a number of timeslots in the first wireless channel allocated in the first wireless communication link to accommodate the decrease in the number of timeslots of the first wireless channel allocated for use by the second wireless communication link.

21. A system comprising:

a first wireless base station operative to:

establish a first wireless communication link between the first wireless base station and a mobile communication device;

receive notification of a second wireless communication link established between a second wireless base station and the mobile communication device, a combination of the first wireless communication link and the second wireless communication link providing the mobile communication device connectivity to a remote network;

detect a reduction in bandwidth allocated for communicating with the mobile communication device over the second wireless communication link; and adjust usage of the first wireless communication link in response to the detected reduction in bandwidth for communicating with the mobile communication device over the second wireless communication link.

22. The system as in claim 21, wherein the first wireless base station is further operative to:

in response to the reduction in bandwidth allocated for use by the mobile communication device over the second wireless communication link, receive data from the second wireless base station, the data targeted for delivery to the mobile communication device; and communicate the data from the first wireless base station over the first wireless communication link to the mobile communication device.

23. The system as in claim 21, wherein the detected reduction in bandwidth over the second wireless communication link includes loss of downlink bandwidth allocated to support communications between the second wireless base station and the mobile communication device.

24. The system as in claim 21, wherein the first wireless base station is further operative to:

in response to the detected reduction in bandwidth over the second wireless communication link, support downlink communications associated with the second wireless base station over the first wireless communication link from the first wireless base station to the mobile communication device.

25. The system as in claim 21, wherein the first wireless base station is further operative to:

increase an amount of bandwidth allocated to communicate in a downlink direction from the first wireless base station and the mobile communication device to accommodate the reduction in bandwidth allocated for use by the mobile communication device over the second wireless communication link.

26. The system as in claim 21, wherein the first wireless access point is further operative to:

transmit a command from the first wireless base station to the mobile communication device, the command controlling transmission of wireless uplink communications from the mobile communication device over the second wireless communication link to the second wireless base station.

27. The system as in claim 21, wherein the second wireless base station is operative to notify the mobile communication device of the reduction in bandwidth allocated for use by the mobile communication device to communicate over the second wireless communication link.

28. The system as in claim 21, wherein the first wireless base station is further operative to:

receive a message over the first wireless communication link from the mobile communication device, the message requesting a change in allocated downlink bandwidth over the first wireless communication link from the first wireless base station to the mobile communication device, the message received in response to the reduction in bandwidth allocated for use by the mobile communication device over the second wireless communication link.

29. The system as in claim 21, wherein the first wireless base station is further operative to:

in response to detecting a reduction in bandwidth allocate for use by the mobile communication device over the second wireless communication link, increase an amount of bandwidth allocated to communicate in a downlink direction from the first wireless base station and the mobile communication device, the increased amount of bandwidth in the downlink direction accommodating the reduction in bandwidth allocated for use try the mobile communication device over the second wireless communication link.

30. The system as in claim 21, wherein the first wireless base station is further operative to:

communicate with a spectrum access system for allocation of supplemental wireless bandwidth to support an increase in bandwidth supporting communications over the first wireless communication link.

31. The system as in claim 30, wherein the second wireless base station is further operative to:

communicate with the spectrum access system for allocation of wireless bandwidth to support the second wireless communication link.

32. The system as in claim 21, wherein the first wireless base station is a first CBSD (Citizens Broadband radio Service Device); and wherein the second wireless base station is a second CBSD (Citizens Broadband radio Service Device).

33. The system as in claim 21, wherein the first wireless communication link is established between the first wireless base station and the mobile communication device in accordance with a 5G wireless communication protocol; and wherein the second wireless communication link is established between the second wireless base station and the mobile communication device in accordance with a 4G wireless communication protocol.

34. Computer-readable storage hardware having instructions stored thereon, the instructions, when carried out by computer processor hardware, cause the computer processor hardware to:

establish a first wireless communication link between a first wireless base station and a mobile communication device;

receive notification of a second wireless communication link established between a second wireless base station and the mobile communication device, a combination of the first wireless communication link and the second wireless communication link simultaneously providing the mobile communication device connectivity to a remote network;

detect a reduction in bandwidth allocated for use by the mobile communication device over the second wireless communication link; and adjust usage of the first wireless communication link to support the second wireless communication link in response to the detected reduction in bandwidth over the second wireless communication link to convey wireless communications.

* * * * *

UNITED STATES PATENT AND TRADEMARK OFFICE

CERTIFICATE OF CORRECTION

PATENT NO. : 11,497,073 B2
APPLICATION NO. : 16/951227
DATED : November 8, 2022
INVENTOR(S) : Volkan Sevindik It is certified that error appears in the above-identified patent and that said Letters Patent is hereby corrected as shown below:

In the Claims

Column 22, Claim 29, Line 3, replace "allocate" with --allocated--
Column 22, Claim 29, Line 11, replace "try" with --by--

Signed and Sealed this
Tenth Day of January, 2023

Katherine Kelly Vidal

Katherine Kelly Vidal
*Director of the United States Patent and Trademark Office*